United States Patent [19]

McNaught et al.

[11] 4,416,486
[45] Nov. 22, 1983

[54] VEHICLE CAB

[75] Inventors: James B. McNaught, St. Germaine-en Laye; Guy E. P. Colotte, Bretigny, both of France

[73] Assignee: Massey-Ferguson Services N.V., Curacao, Netherlands Antilles

[21] Appl. No.: 253,744

[22] PCT Filed: Aug. 9, 1980

[86] PCT No.: PCT/EP80/00076
§ 371 Date: May 1, 1981
§ 102(e) Date: Apr. 3, 1981

[87] PCT Pub. No.: WO81/00541
PCT Pub. Date: Mar. 5, 1981

[30] Foreign Application Priority Data

Aug. 31, 1979 [GB] United Kingdom ................ 7930255

[51] Int. Cl.³ .............................................. B62D 33/06
[52] U.S. Cl. .................................. 296/190; 296/146; 280/163; 180/89.12; 49/208
[58] Field of Search ............. 296/190, 202, 151, 146, 296/71; 180/89.12, 77 S; 280/163, 166; 105/437, 438, 442; 256/1, 59; 49/236, 240, 208, 381, 388; 16/389

[56] References Cited

U.S. PATENT DOCUMENTS

| 116,287 | 6/1871 | Farrel | 16/389 |
|---|---|---|---|
| 3,278,222 | 10/1966 | Mullet | 296/190 |
| 3,279,843 | 10/1966 | Hafer | 296/190 |
| 3,802,530 | 4/1974 | Purcell | 296/146 |
| 3,998,489 | 12/1976 | Blakeslee | 296/28 CV |
| 4,074,788 | 2/1978 | Joubert | 296/190 |
| 4,221,274 | 9/1980 | Martin, Jr. | 296/190 |

FOREIGN PATENT DOCUMENTS

| 2424441 | 4/1975 | Fed. Rep. of Germany | 296/190 |
|---|---|---|---|
| 2110069 | 5/1972 | France | 296/190 |
| 2397951 | 2/1979 | France | 296/190 |
| 925260 | 5/1963 | United Kingdom | 296/190 |
| 1330983 | 9/1973 | United Kingdom | 296/190 |

Primary Examiner—David M. Mitchell
Assistant Examiner—Joseph McCarthy
Attorney, Agent, or Firm—Robert L. Farris

[57] ABSTRACT

A cab for an agricultural, industrial or construction vehicle having front (8), rear (20) and side walls (9) and a driver access door (17) that is hinged along its forward upright edge relative to a side wall (9) and assumes a closed position in which it is angled from said side wall (9) towards the rear wall (20) so that it faces both sideways and rearwards and opens outwards over an entry platform (32) alongside the doorway (15). The door (17) is supported by a hinge assembly (26,27) so that the whole of the upper end of the door (17) moves outwards further than the lower end of the door (17) as the door is opened. Preferably, the upper hinge member (26) is cranked relative to the door (17) and/or the hinge axis (X—X) may be inclined rearwards from top to bottom. A hand-rail (34) may be provided along the outer edge of the platform and be pivotally connected to the door (17) at a point (35) spaced rearwards of the forward edge of the door.

9 Claims, 6 Drawing Figures

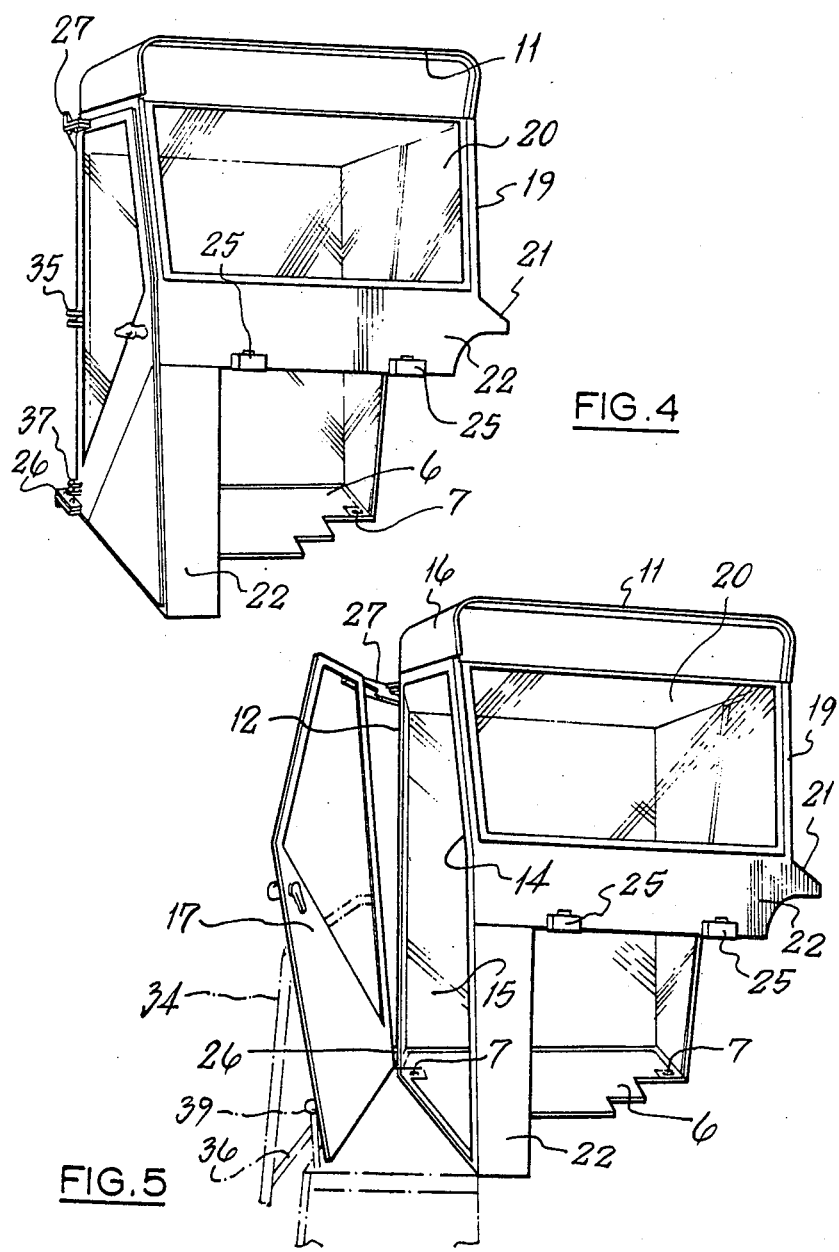

VEHICLE CAB

TECHNICAL FIELD

This invention relates to a cab for an agricultural, industrial or construction vehicle.

Self-propelled combine harvesters are subject to an overall width limitation in order to make them acceptable as road-going vehicles. This in turn imposes limitations on engine and cab size and layout. In particular, it is well known to arrange the engine and cab alongside one another at the front of the harvester and to provide access to the cab through a door on that side of the cab opposite the engine. An entry platform is provided alongside the door and thus adds to the overall width of the harvester. For reasons of safety and convenience the platform cannot be made too narrow. In particular, if the door opens outwards over the platform it has to open sufficiently to allow access by the driver but to be safe it should not open beyond the periphery of the platform. Generally, the door is hinged along its upright leading edge so as to open forwards over the platform. Steps may be provided up to the rear edge of the platform and a handrail may be provided along the outer edge of the platform and steps and limit outwards opening movement of the door.

DISCLOSURE OF THE INVENTION

An object of the present invention is to provide a cab for a combine harvester that makes more efficient use of the overall width of the harvester.

According to the invention, a cab has front, rear and side walls and a driver access door that is hinged along its forward upright edge to an adjcent side wall and opens outwards to the outer limit of an entry platform that is provided alongside the doorway and is mounted from the rear, and is characterized in that the access door is adapted so that it assumes a closed position in which it is angled from said adjacent side wall towards the rear wall so that it faces both sideways and rearwards and at least part of the entry platform lies within the width of the cab between the side walls.

The angled disposition of the doorway thus improves access to the cab whilst reducing the extent to which the entry platform need extend outwards beyond the line of said adjacent side wall.

In order to further improve access to the cab, the door is preferably supported by a hinge assembly so that the top of the door moves outwards further than the bottom of the door during opening, thereby giving increased width for access at shoulder height.

The hinge assembly may be such that the upper hinge member is fixedly connected to the door at one end and is pivotally connected relative to said adjacent side wall at its other end at a point spaced forwards of the leading edge of the door and offset inwards from the plane of the door. For example, the upper hinge member may be cranked relative to the door thereby producing an additional outwards movement of the top of the door as it opens.

Alternatively or additionally the hinge assembly may be such that the hinge axis is inclined rearwards from top to bottom, so that the top and bottom portions of the door move about horizontally displaced centres and thereby produce said outwards movement of the top of the door relative to the bottom of the door.

For reasons of safety and convenience a hand-rail may be provided along the outer edge of the platform and steps. Preferably, the hand-rail is pivotally connected to the door at a point spaced away from the hinge axis towards the rear edge of the door, and is shaped so that it moves with the door and allows an increased opening movement.

DESCRIPTION OF THE DRAWINGS

The invention will now be described by way of example with reference to the accompanying drawings in which:

FIG. 4 is a rear elevation of the cab of FIG. 1 with the door closed;

FIG. 5 is a rear elevation of the cab of FIG. 1 with the door open; and

BEST MODE OF CARRYING OUT INVENTION

Figure 1:
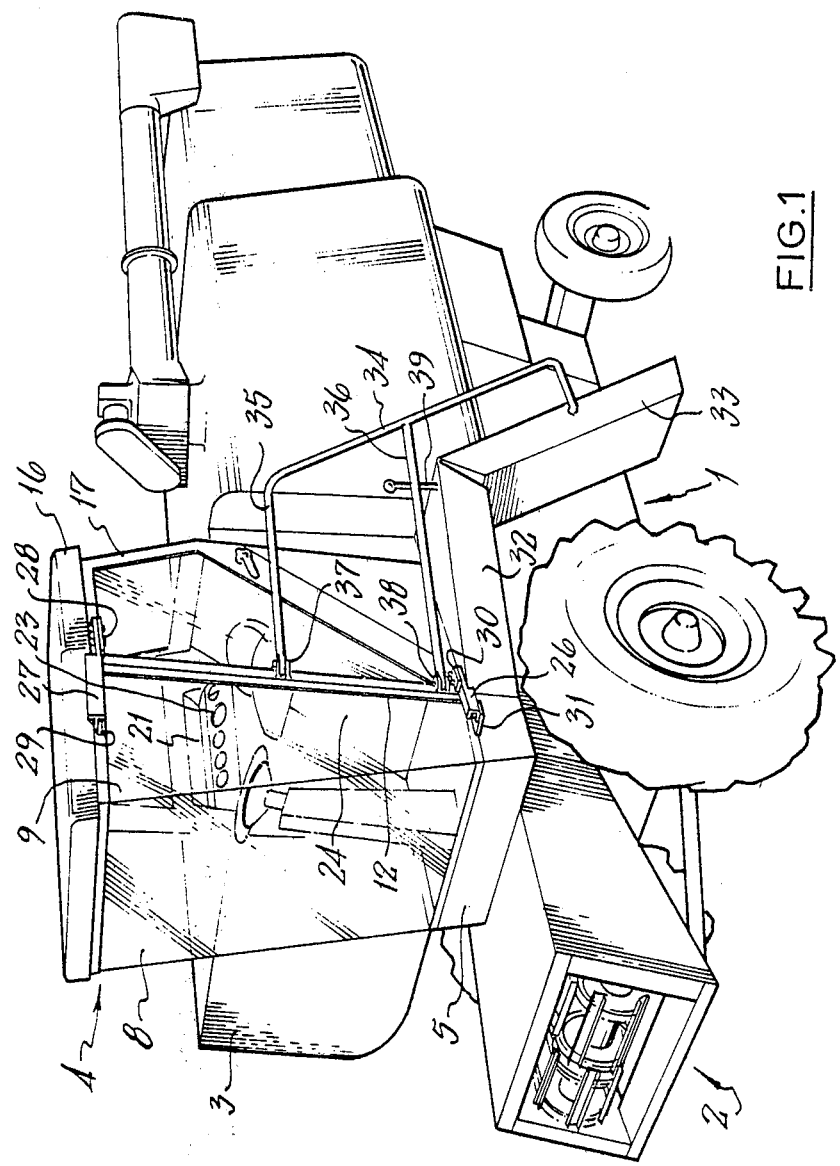
FIG. 1 is a perspective view of a self-propelled combine harvester fitted with a cab according to the invention.

The harvester illustrated in FIG. 1 comprises a self-propelled chassis 1 carrying a crop elevator 2 at the front for attachment to a harvesting head, grain separating and cleaning apparatus, and grain tanks, all of which may be of conventional construction. An engine powers the harvester and is mounted in a housing 3 at the front of the harvester alongside a cab 4 for the driver. The cab is detachably mounted on a platform 5 and is shown detached in FIGS. 2 to 5.

The cab 4 comprises a floor panel 6 provided with two mounting points 7 at the front by which it is located and bolted onto the platform 5. The front wall 8 and the adjacent sections 9 of the side walls are composed of toughened glass panels that are joined by adhesive along this abutting edges 10, and are joined by adhesive to the floor 6 and roof 11. The front wall 8 is inclined forwards towards the roof 11 and the rear edges of the side panels 9 are inclined rearwards towards the roof and are connected to upright posts 12, 13.

The nearside post 12 (as seen in FIG. 1) and the adjacent corner post 14 of the cab form a door frame defining a door opening 15 lying in a plane inclined away from the adjacent side panel 9 towards the rear of the cab, the roof being cut away at the adjacent rear corner 16 to match the inclination of the door opening. A door 17 is hinged to the cab along its forward edge so as to cooperate with the door opening 15, as described hereinafter.

Figure 3:
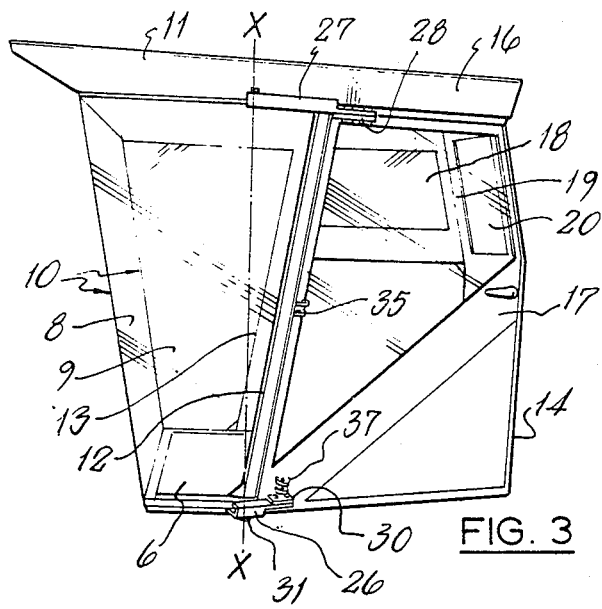
FIG. 3 is a side elevation of the cab of FIG. 1.
Figure 2:
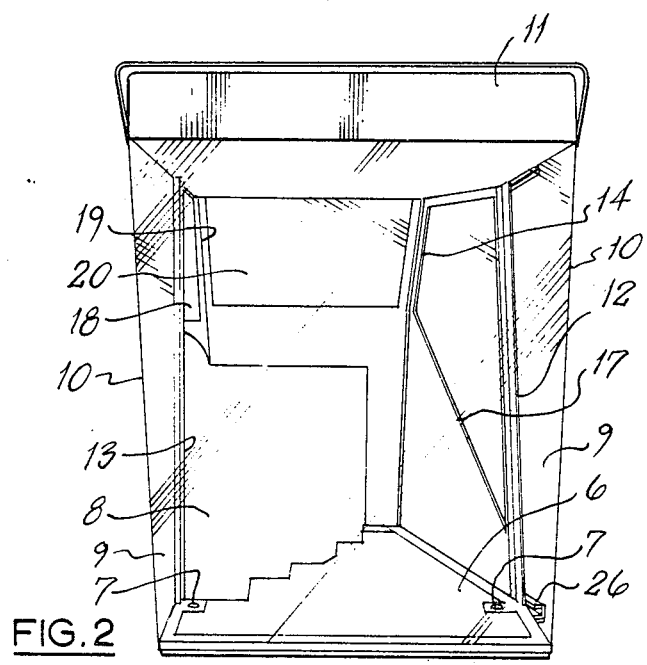
FIG. 2 is a front elevation of the cab of FIG. 1.

An opening window 18 is provided between the offside post 13 (as seen in FIG. 3) and the adjacent corner post 19, and a rear window 20 is provided between the two corner posts 14, 19. Panels 21, 22 extend along the lower edges of the windows 18, 20 and downwards alongside the rear corner post 19, and are shaped so as to cooperate with corresponding portions of the harvester body. The lower portion of the post 13 and the panel 21 cooperate and form a seal with the engine housing 3, the latter being provided with an instrument panel 23. The panel 21 cooperates and forms a seal with the housing 24 over the threshing and separating drive mechanism. Two mounting points 25 on the panel 21 project rearwards and are used to locate and bolt the cab to the housing 24.

The door 17 is hinged to the cab top and bottom by a pair of hinges 26, 27, each comprising an arm rigidly connected at one end to the door and pivotally connected at its other end to the cab. The lower hinge arm 26 is connected to the door via a bracket 30 and projects forwards along the line of the bottom of the door and is pivotally connected to the floor of the cab adjacent the bottom of the post 12 via a bracket 31. The upper hinge arm 27 is rigidly connected to the door via a bracket 28 and extends forwards and is cranked at the forward edge of the door to accommodate the change in plane between the door opening 15 and the glass side panel 9. The forward end of the arm 27 is pivotally connected to the roof via a bracket 29 at a point spaced forwards of the top of post 12 above the pivotal connection of the lower arm 26 so as to define a substantially vertical hinge axis X—X (FIG. 3).

The door 17 opens outwards over a triangular shaped entry platform 32 that is formed by a lateral extension of the platform 5. The platform 32 extends rearwards from the bottom of the post 12 and widens towards the rear, where a ladder 33 extends down to ground level. FIG. 5 shows the degree of accessability given to the driver by this arrangement of the door and entry platform. The inclination of the door opening 15 relative to the side panel 9 of the cab gives limited access before the door opens beyond the cab boundary formed by the plane of panel 9, and thus the door need only open a limited extent beyond this boundary to give adequate accessability. The entry platform 32 therefore need only project a limited extent beyond the side boundary of the cab.

Accessability is also increased by the action of the upper cranked hinge arm 27 which causes the upper part of the door to move away from the side of the cab as it is opened. The top of the door therefore leans outwards relative to the bottom of the door when opened, as seen in FIG. 5, and access at shoulder height is therefore improved.

In an alternative embodiment of the invention, the outwards lean of the top of the door when open can be increased by arranging that the hinge axis X—X is inclined forwards towards the top of the door, for example, by lengthening the forward projecting end of the hinge arm 27 and shifting the bracket 29 forwards in FIG. 3. The top edge of the door then swings about a hinge centre that is displaced forwards of the corresponding hinge centre of the bottom edge of the door and thus the top edge moves outwards relative to the bottom edge as the door opens beyond the plane of the adjacent side wall 9.

In yet another alternative embodiment of the invention, the door may be hinged about an axis that extends substantially parallel to the edge of the door and which is inclined forwards towards the top of the door so that as the door opens the top of the door moves outwards relative to the bottom of the door solely as a result of said forwards inclination of the hinge axis. For example, the post 12 may be inclined forwards at its top in FIG. 3 and the same hinge arm 26 used both top and bottom in hinging the door to the cab.

The axis X—X in the illustrated embodiment is substantially vertical as seen in FIGS. 4 and 5 but it will be appreciated that this may vary.

As shown in the embodiment of FIGS. 1 to 5, a hand-rail 34 is provided along the outer periphery of the platform and steps and serves to limit outwards opening movement of the door. The hand-rail 34 comprises a portion 35 above the periphery of the platform and a parallel rail 36 beneath it. Both rails 35, 36 are pivotally connected to the leading edge of the door 17 via pairs of brackets 37, 38. A relleaseable latch mechanism 39 connects the hand-rail too the platform 32.

Figure 6:
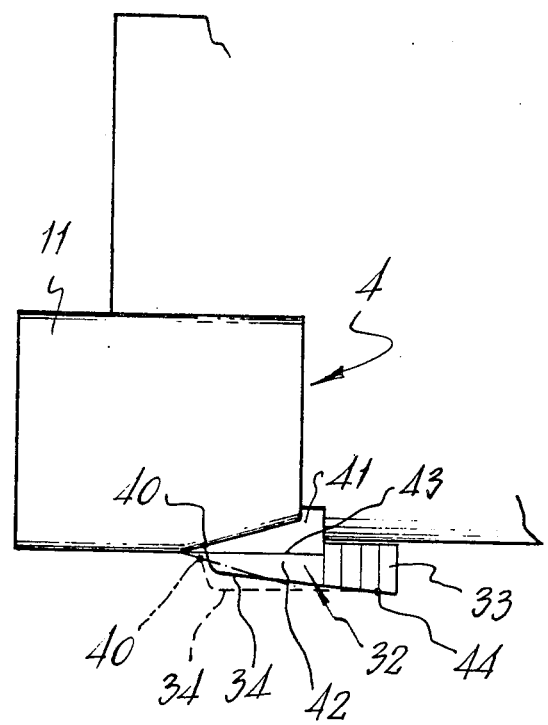
FIG. 6 is a schematic plan view of a cab similar to that of FIGS. 1 to 5 but with a modified hand-rail.

In a alternative embodiment illustrated in FIG. 6 the hand-rail 34 and its connection to the door have been modified so that the hand-rail 34 moves outwards with opening of the door and thus allows a larger opening movement. This is achieved by shaping the end of the rail near the door so that it is cranked inwards towards the door, and by pivotally connecting this end of the hand rail 34 to the door at a point 40 spaced further towards the rear edge of the door. Opening of the door then moves the pivot point 40 of the hand-rail outwards and the handrail pivots towards the rear edge of the door, as shown in FIG. 6. The hand-rail 34 is also supported at a point 44 on the platform or ladder so as to allow said movement of the hand-rail.

In other embodiments of the invention the entry platform 32, or at least part of the entry platform, and the ladder 33 may be adapted so that they can be folded against the side of the combine harvester. For example, the platform 32 may comprise an inner fixed section 41 and an outer section 42 that is hinged to the fixed section 41 so that it can be swung downwards beneath it, the two sections abutting along a line 43 parallel to the side wall of the cab as shown in FIG. 6. The width of the harvester can thus be reduced by folding the ladder 33 against the side of the combine, folding the platform section 42 down, and swinging the hand-rail 34 inwards.

A cab such as that illustrated may be used on other machines besides a combine harvester. For example, it can be used on other agricultural vehicles such as forage harvesters, or industrial or construction vehicles or machines.

We claim:

1. A cab for an agricultural, industrial or construction vehicle having a front wall, rear wall, side walls and a driver access door; hinge assemblies connected between a forward upright edge of the door and an adjacent side wall so that the door swings about an upright hinge axis (X-X) between a closed and fully open position; an entry platform that is provided alongside the doorway; steps provided at the rear of the platform for access from the ground; and stop means that prevents the door opening beyond the outer edge of the platform and thereby defines the fully open position of the door; the cab being adapted so that in the closed position the door is angled from said adjacent side wall (9) towards the rear wall (20, 22) with its outer surface facing both sidewards and rearwards, and in the fully open position defined by said stop means (34) is angled from said adjacent side wall (9) sidewards and rearwards over the full width of the platform (32) with its inner surface facing rearwards; and said hinge axis (X—X) being orientated relative to the plane of the door (17) so that the upper edge of the door (17) moves outwards further than the lower edge of the door (17) as the door is opened and the door is thereby inclined outwards from bottom to top in the fully open position.

2. A cab as claimed in claim 1 further characterized in that the hinge axis (X—X), of the door (17) is substantially vertical in side elevation.

3. A cab as claimed in claim 1 further characterized in that a hand-rail (34) is provided adjacent the outer edge of the steps (33) and platform (32) and is pivotally connected to the door (17) at its leading edge.

4. A cab as claimed in claim 3 further characterized in that the hand-rail (34) is pivotally connected to the door (17) at a point (35) on the door spaced rearwards from its leading edge and in such a manner as to cause the hand-rail (34) to move outwards with the door (17) and pivot towards the rear edge of the door as the door (17) is opened.

5. A cab as claimed in claim 4 further characterized in that the hand-rail (34) has an inwardly bent end portion terminating in the pivotal connection to the door (17).

6. A cab for an agricultural, industrial or construction vehicle having a front wall, rear wall, side walls and a driver access door; upper and lower hinge assemblies connected between a forward upright edge of the door and an adjacent side wall so that the door swings about an upright hinge axis between a closed and fully open position; an entry platform that is provided alongside the doorway; steps provided at the rear of the platform for access from the ground; and stop means that prevents the door opening beyond the outer edge of the platform and thereby defines the fully open position of the door; the cab being adapted so that in the closed position the door is angled from said adjacent side wall towards the rear wall with its outer surface facing both sidewards and rearwards, and in the fully open position defined by said stop means (34) is angled from said adjacent side wall sidewards and rearwards over the full width of the platform (32) with its inner surface facing rearwards; said upper and lower hinge assemblies each comprising a hinge member (27) that is fixedly connected to the door (17) at one end and is pivotally connected relative to said side wall (9) at its other end at a point spaced forwards of the adjacent upright edge of the door (17), said pivotal point of the upper hinge member (27) being spaced forwards of the adjacent upright edge of the door further than said pivotal point of the lower hinge member (26) is spaced forwards of the adjacent upright edge of the door.

7. A cab for an agricultural, industrial or construction vehicle having a front wall, rear wall, side walls and a driver access door; hinge assemblies connected between a forward upright edge of the door and an adjacent side wall so that the door swings about an upright hinge axis between a closed and fully open poisition; an entry platform that is provided alongside the doorway; steps provided at the rear of the platform for access from the ground; and stop means that prevents the door opening beyond the outer edge of the platform and thereby defines the fully open position of the door; the cab being adapted so that in the closed position the door is angled from said adjacent side wall towards the rear wall with its outer surface facing both sidewards and rearwards, and in the fully open position defined by said stop means (34) is angled from said adjacent side wall sidewards and rearwards over the full width of the platform (38) with its inner surface facing rearwards; and wherein said hinge axis (X—X) of the door (17) is inclined rearwards from top to bottom in side elevation.

8. A cab for an agricultural, industrial or construction vehicle having a front wall, rear wall, side walls and a driver access door; hinge assemblies connected between a forward upright edge of the door and an adjacent side wall so that the door swings about an upright hinge axis between a closed and fully open position; an entry platform that is provided alongside the doorway; steps provided at the rear of the platform for access from the ground; and stop means that prevents the door opening beyond the outer edge of the platform and thereby defines the fully open position of the door; the cab being adapted so that in the closed position the door is angled from said adjacent side wall towards the rear wall with its outer surface facing both sidewards and rearwards, and in the fully open position defined by said stop means (34) is angled from said adjacent side wall sidewards and rearwards over the full width of the platform (32) with its inner surface facing rearwards; and said hinge assemblies (26, 27) defining said upright hingle axis (X—X) so that it diverges from the bottom to the top of the door in the forward direction relative to the plane of the door.

9. A cab as claimed in claim 8 further characterized in that the forward edge of the door opening (15) is inclined forwards from top to bottom.

* * * * *